United States Patent [19]

Gordon

[11] 4,031,451
[45] June 21, 1977

[54] CHARGING CIRCUIT WITH SCR'S TRIGGERED BY PEDESTAL AND COSINE MODIFIED RAMP UNIJUNCTION CIRCUIT HAVING MEANS FOR CURRENT LIMITING BY CONTROLLING PEDESTAL LEVEL

[75] Inventor: Peter H. Gordon, Framingham, Mass.

[73] Assignee: Alkon Laboratories, Inc., Newton, Mass.

[22] Filed: Feb. 23, 1976

[21] Appl. No.: 660,764

[52] U.S. Cl. .................................. 320/23; 320/39; 320/DIG. 2; 323/22 SC

[51] Int. Cl.² ......................................... H02J 7/10

[58] Field of Search .............................. 320/21–24, 320/32, 33, 39, 40, DIG. 2; 323/9, 22 SC, 34

[56] References Cited

UNITED STATES PATENTS

| 3,382,425 | 5/1968 | Legatti ............................. 320/32 |
| 3,504,269 | 3/1970 | Hallahan, Jr. ............... 320/DIG. 2 |
| 3,586,955 | 6/1971 | Kisiel ............................. 320/32 X |
| 3,766,463 | 10/1973 | Ruben .............................. 320/23 |

Primary Examiner—Robert J. Hickey
Attorney, Agent, or Firm—Charles Hieken; Jerry Cohen

[57] ABSTRACT

A battery charging circuit gates charging current through a silicon controlled rectifier triggered by a pedestal and cosine modified ramp unijunction circuit. A battery potential sensing circuit limits the initial surge current delivered to a fully discharged battery and provides short circuit protection, a second battery potential sensing circuit limits the current delivered to a fully charged battery to a level required to maintain the float potential, and a charging current sensing circuit limits the average value of current delivered to the battery to a desired level during low battery impedance and/or high line conditions, all by controlling the pedestal level.

9 Claims, 1 Drawing Figure

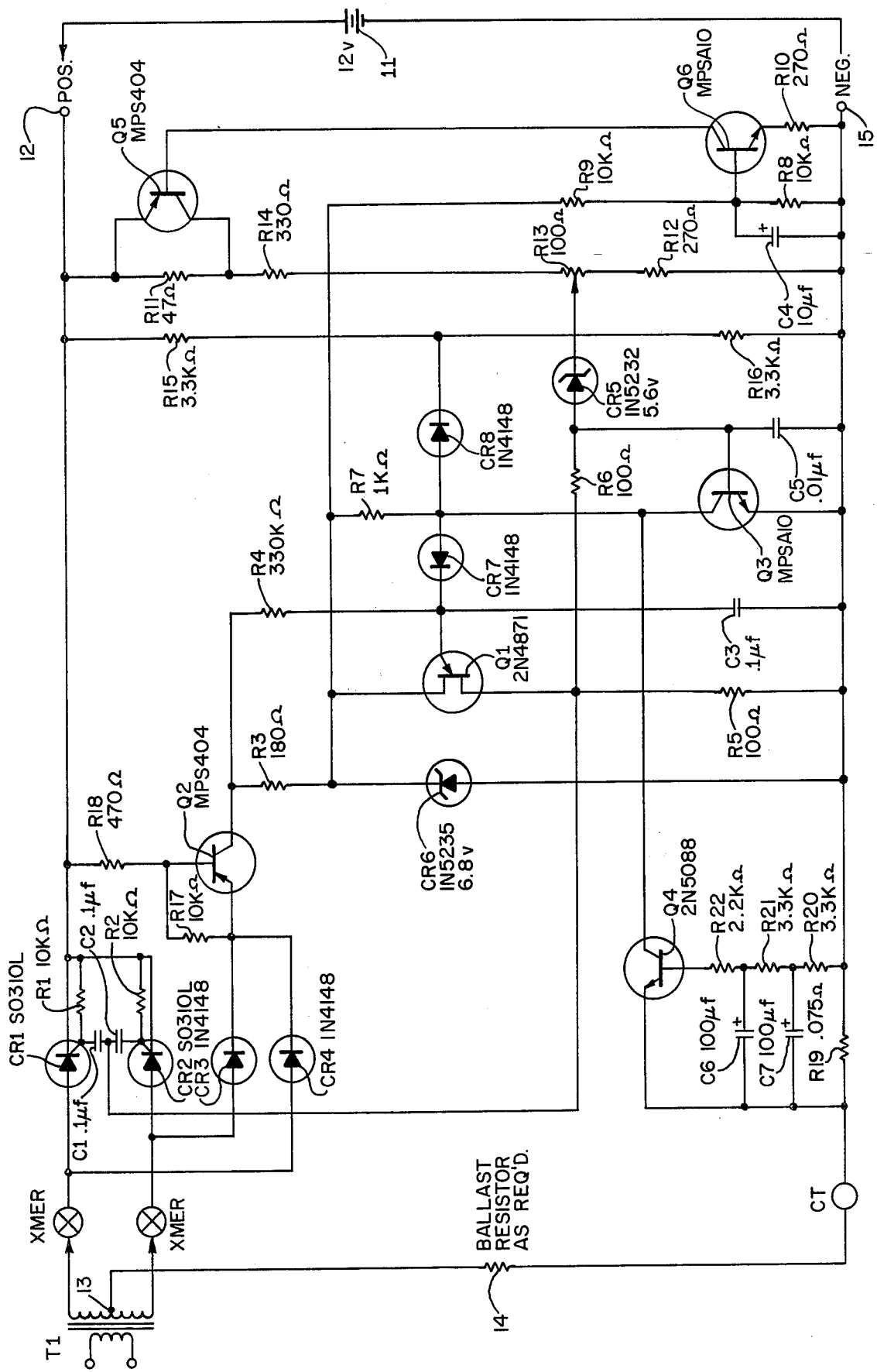

CHARGING CIRCUIT WITH SCR'S TRIGGERED BY PEDESTAL AND COSINE MODIFIED RAMP UNIJUNCTION CIRCUIT HAVING MEANS FOR CURRENT LIMITING BY CONTROLLING PEDESTAL LEVEL

BACKGROUND OF THE INVENTION

The present invention relates in general to battery charging and more particularly concerns an improved battery charging circuit with silicon controlled rectifiers triggered by a pedestal and cosine modified ramp (PCMR) unijunction circuit that may charge a dead battery while limiting the initial surge current and providing short circuit protection, properly establishing a trickle charge when the battery is charged to maintain the float potential and limiting the average charging current when the battery impedance is low and/or line conditions are high with reliable circuitry that is relatively inexpensive.

The present invention is an improvement over the invention disclosed in U.S. Pat. No. 3,766,463.

It is an important object of this invention to provide improved battery charging circuitry.

It is a further object of the invention to achieve the preceding object with a circuit capable of charging a battery while limiting the initial surge current delivered to the battery and providing short circuit protection.

It is another object of the invention to achieve one or more of the preceding objects while limiting the current delivered to a fully charged battery to a level required to maintain float potential.

It is a further object of the invention to achieve one or more of the preceding objects while limiting the average value of current delivered to the battery during low battery impedance and/or high line conditions.

It is a further object of the invention to achieve one or more of the preceding objects with reliable circuitry that is relatively inexpensive to fabricate and relatively easy to adjust and capable of maintaining a battery, such an as emergency battery, at float potential for long periods of time and rapidly restoring the battery to float level when the battery is discharged.

SUMMARY OF THE INVENTION

According to the invention, there is a source of A.C. energy and silicon controlled rectifier means for providing current pulses of controlled duration to a battery terminal. Means are provided for setting the firing angle of the silicon controlled rectifier means to provide an average value of said current pulses related to the state of charge of a battery connected to the battery terminal comprising a PCMR unijunction trigger circuit. There is battery potential sensing circuit means responsive to a potential corresponding to a dead battery for controlling the pedestal level of said trigger circuit to limit the initial surge current delivered to a dead battery and provide short circuit protection. There is second battery potential sensing circuit means responsive to a potential representative of a fully charged battery for establishing said pedestal level to a value causing the average value of said current pulses to be just enough to maintain the float potential of the battery. There is charging current sensing means responsive to the battery potential exceeding the predetermined level for establishing the pedestal level to a value that limits the average value of current delivered to the battery to a predetermined value when the battery impedance is low and/or line voltage is higher than normal.

Numerous other features, objects and advantages of the invention will become apparent from the following specification when read in connection with the accompanying drawing.

BRIEF DESCRIPTION OF THE DRAWING

The single FIGURE of which is a schematic circuit diagram of a preferred embodiment of the invention.

DETAILED DESCRIPTION OF PREFERRED EMBODIMENTS

With reference now to the drawing, there is shown a schematic circuit diagram of a preferred embodiment of the invention. Fundamentally, the circuit according to the invention may be grouped into the power circuits, the trigger circuits and the potential control circuits. Power delivered to the primary of transformer T1, typically from a 110 volt A.C. line, is controlled to keep the battery 11 charged.

The power circuits comprise center-tapped transformer T1 having its secondary in series with silicon controlled rectifiers CR1 and CR2 forming a full-wave, center-tapped D.C. power supply with the cathode of the silicon controlled rectifiers connected to positive terminal 12 to which the positive terminal of battery 11 is connected. The center tap 13 of transformer T1 is direct-coupled through ballast resistor 14, if necessary, and sensing resistor R19 to negative terminal 15 to which the negative terminal of battery 11 is connected.

The trigger circuit comprises unijunction transistor Q1, resistors R3, R4 and R5 and capacitor C3. This PCMR circuit produces a pulse across lower base resistor R5 when the voltage on its emitter exceeds a predetermined value. Capacitors C1 and C2 couple this pulse to the gates of silicon controlled rectifiers CR1 and CR2 to fire the forward-biased one of them. Resistors R1 and R2 bias the gate electrodes to cathode potential. A Zener diode CR6 clamps the upper base of unijunction transistor Q1 to a predetermined level.

There are three circuits for controlling the pedestal levels of the PCMR circuit and consequently the battery charging current. A first of these circuits comprises current sensing resistor R19, the two-pole filter circuit comprising resistors R20, R21 and R22 and capacitors C6 and C7 and transistor Q4 for limiting the initial surge current and providing short circuit protection. Diode CR8 and resistors R15 and R16 comprise part of the circuitry for reducing the peak charging current supplied to a dead battery.

Transistor Q3 and associated components including potentiometer R13 and diode CR5, resistor R6 and capacitor C5 comprise means for establishing a trickle charge to keep the battery at float potential when fully charged.

Transistors Q5 and Q6 and associated components form an overshoot circuit which causes the battery to charge to a level above its float potential before settling to the final float potential and coacts with the circuitry comprising transistor Q3 and associated components to assure thorough charging of the battery and snap-acting response to current demand changes.

Having briefly described the circuit arrangement, its mode of operation will be described. The main path for charging current is from the secondary of transformer T1, through the conducting one of silicon controlled rectifiers CR1 and CR2, through battery 11, through current sensing resistor R19 and optional ballast resistor 14 back to the center tap 13 of the secondary of transformer T1. The circuit closes when a positive pulse applied to the junction of capacitors C1 and C2 gates on the forward-biased silicon controlled rectifier, and it opens an an angle of approximately 135° of the sinusoid when the then conducting silicon controlled rectifier ceases conduction.

The PCMR circuit provides a positive-going trigger pulse across resistor R5 when the voltage to which capacitor C3 charges exceeds about 85% of the voltage on the upper base of unijunction transistor Q1. Zener diode CR6 clamps this potential to 6.8 volts, to provide a stable reference point for circuit operation. Early in each 120 Hz cycle, capacitor C3 receives precharging current through the full wave rectifier circuit comprising diodes CR3 and CR4 and transformer T1, through transistor switch Q2, resistors R3 and R7 and diode CR7 to establish a pedestal level. If this pedestal level is insufficient to fire unijunction transistor Q1, capacitor C3 receives additional charging current at a reduced rate through the larger resistance R4. This cosine modified ramp charging action continues until capacitor C3 attains the firing potential of unijunction transistor Q1. Capacitor C3 then discharges rapidly through unijunction transistor Q1, capacitors C1 and C2 and the gate of the forward-biased silicon controlled rectifier, causing the latter to conduct and pass charging current to battery 11. Since the aproximately 1 volt drop across the conducting SCR is insufficient to forward bias both diodes CR3 and CR4 and the emitter-base junction of switching transistor Q2, transistor Q2 turns off when an SCR turns on, and the current through the PCMR circuitry ceases.

The SCR conduction angle determines the average current delivered to the battery. Since the SCR turns off at a fixed angle of the input waveform, the time or angle of occurrence of the trigger pulse determines this conduction duration. Because the slope of the ramp component is determined by the fixed values of resistor R4 and capacitor C3, the timing of the trigger pulse varies primarily with the pedestal level. Raising the pedestal voltage on capacitor C3 produces a trigger pulse earlier in the cycle with a corresponding increase in the average value of current delivered to the battery. We turn now to a description of the circuits for reducing the pedestal level in response to specific conditions.

The pedestal control circuit comprising transistor Q4 and associated components limits the average current to a level determined by the voltage across current sensing resistor R19. Current passing through this resistor produces a proportional voltage averaged by the two-pole passive filter comprising resistors R20 and R21 and capacitors C6 and C7 delivered to the base of transistor Q4 through resistor R22. If this average voltage exceeds about 0.6 volt, transistor Q4 conducts and draws current through resistor R7. The divider network formed by resistor R7 and transistor Q4 reduces the voltage at the anode of crystal CR7 from the 6.8 volt Zener regulated level, thereby decreasing the pedestal level to which capacitor C3 can precharge. The time required by the ramp circuit to charge capacitor C3 from its reduced pedestal level to the level sufficient to fire the unijunction transistor Q1 thus increases, delaying the SCR trigger pulse.

Resistor R19 senses the decreased charging current, and transistor Q4 reduces conduction until the average current value falls to the desired level. Ballast resistance 14 may be used to keep the average value of current under normal charging conditions near the turn-on level of this limiting circuit to minimize high RMS-to-average current ratios.

Because the rectified transformer voltage and the battery voltage are series opposing, their resultant is greatest when battery 11 is completely discharged. The tendency of some dead batteries to resemble short circuits contributes to the possibility of dangerously high charging current levels. The current limiting circuit described above will keep the average value of charging current at a safe level. However, under high voltage, low impedance conditions, peak current will be higher than normal for the same average current, and may pose a danger to the silicon controlled rectifiers. It has been discovered that this problem may be overcome by delaying the trigger pulse to an even later point in the power cycle than is required by the average current limiting circuit so that the silicon controlled rectifiers fire only when the applied voltage is of relatively low amplitude. Diode CR8 and resistors R15 and R16 coact to reduce peak charging current supplied to a dead battery in the following manner.

The voltage at the anode of diode CR8 is the 6.8 volts across Zener diode CR6 less the potential across resistor R7. Resistors R15 and R16 form a voltage divider that establishes half the battery 11 potential at the cathode of diode CR8 for a 12 volt battery. When the battery voltage is less than 12 volts, diode CR8 is forward biased and draws current through resistor R7 to reduce the pedestal voltage level coupled by diode CR7 to capacitor C3. When fewer than half the battery cells are charged, the pedestal voltage is reduced significantly to lower the average charging current to a level less than normally desired while keeping the peak current levels at acceptable value for the silicon controlled rectifiers. The result is that the silicon controlled rectifiers remain off until the voltage is at a point in the cycle well below its peak so that the peak current levels are acceptable for the silicon controlled rectifiers.

A third pedestal control circuit delays the firing pulse when battery 11 reaches a potential indicative of full charge at the arm of potentiometer R13, causing diode CR5 to conduct and thereby render transistor Q3 conductive and thereby divert precharging current from capacitor C3 to lower the pedestal voltage. By sampling the battery potential before triggering the silicon controlled rectifiers while no charging current flows, the circuit effectively interrogates the electrochemical potential of the battery independent of charging current effects.

Transistor Q3 also provides the function described in the aforesaid U.S. Pat. No. 3,766,463 of preventing unijunction transistor Q1 from remaining latched on if its firing fails to trigger a silicon controlled rectifier on. When unijunction transistor Q1 fires, the positive-going pulse produced across resistor R5 is coupled by resistor R6 to the base of transistor Q3 to turn transistor Q3 on and thereby reverse-bias diode CR7. Reverse biasing diode CR7 reduces the lower base-emitter current in unijunction transistor Q1 to restore it to the off condition, thereby enabling multiple triggering during the same 120 Hz cycle, if necessary.

Transistors Q5 and Q6 and associated components form an overshoot circuit which causes the battery to charge to a level above its float potential before settling to the final float potential. This circuit works in conjunction with the potential control circuit described above comprising resistor R13 to assure thorough charging of the battery and snap-action response to current demand changes.

The collector of transistor Q2 transmits the rectified transformer voltage in excess of the battery potential when the silicon controlled rectifiers are off. When conduction through an SCR shuts off transistor Q2, its collector voltage falls to ground potential and remains at a low level for the remainder of the 120 Hz cycle. Thus, the average voltage at the collector of transistor Q2 varies inversely with the conduction duration of the silicon controlled rectifiers and with the average current supplied to battery 11. The base of transistor Q3 receives a potential related to the average voltage on the collector of transistor Q2 through a filtering network comprising capacitor C4 and resistors R8 and R9 and conducts when the conduction angle of the silicon controlled rectifiers is less than a predetermined value, thereby causing transistor Q5 to conduct and provide a low impedance shunt across resistor R11, thereby raising the potential on the arm of potentiometer R13.

This potential increase has negligible effect if the firing pulse delay producing the short conduction interval was caused by the average current emitting circuit or the low battery potential sensing circuit. However, if the delay was in response to high battery potential indicative of full charge, regenerative action begins. Diode CR5, already conducting conducts heavier because the cathode potential is increased to provide more base current to transistor Q3 which then draws more current through resistor R7, further lowering the pedestal level. Unijunction transistor Q1 then triggers the silicon controlled rectifiers later in the cycle, the average voltage on the collector of transistor Q2 further increases, and transistor Q6 conducts more heavily so that transistor Q5 saturates sharply at the overshoot potential.

The sudden saturation of transistor Q5 causes transistor Q3 to prevent additional trigger pulses until the battery potential falls by an amount equal to the voltage drop across resistor R11 before conducting transistor Q5 shorted it. The lower float potential is maintained by controlled pulses of current whose short duration causes transistor Q6 to remain turned on. Resistors R12 and R14 are scaling resistors chosen in conjunction with potentiometer R13 to select a proper operating point for various Zener diodes CR5 and different battery potentials to achieve the mode of operation described above.

If a load is placed on battery 11 when floating, the regenerative action occurs in reverse. The falling battery potential produces a lower potential on the arm of potentiometer R13 to reduce conduction through diode CR5 and base current to transistor Q3 to reduce its collector current and allow the pedestal voltage to rise to a higher level. Unijunction transistor Q1 provides trigger pulses earlier in each cycle to increase the conduction angle of the silicon controlled rectifiers, transistor Q2 conducts less during each cycle, and the average voltage on its collector decreases. The voltage at the base of transistor Q6 decreases, causing less current to flow through transistor Q5 and more voltage across resistor R11 to produce still a lower voltage on the arm of potentiometer R13. In this way positive feedback causes changes in battery potential to be magnified and thereby improve the response time of the charging cirucit.

The overshoot circuit insures that the fully charged condition will be reached regardless of component tolerances that might otherwise cause regulation of the battery to less than its fully charged potential. In addition, the small amount of gassing produced by the slight overcharge tends to produce a more uniform charge by reducing acid gradients in the electrolyte.

There has been described novel apparatus and techniques for providing an improved battery charging circuit adapted to be connected across a power line in continuous association with a battery that may be used, for example, for emergency lighting. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Electrical battery charging apparatus comprising,
input terminal means for receiving A.C. energy,
output terminal means for receiving a potential from a battery to be charged,
gated rectifier means intercoupling said input and output terminal means for converting said A.C. energy into D.C. energy for charging said battery,
a pedestal and cosine modified ramp unijunction trigger circuit having a unijunction transistor with an emitter connected to an emitter capacitor and means for charging said capacitor to a predetermined pedestal level for controlling the time when said unijunction trigger circuit provides trigger pulses, and circuit means for controlling said pedestal voltage
said circuit means including means responsive to the charging current delivered by said output terminal means for limiting said charging current to less than a predetermined value,
wherein said circuit means for controlling said pedestal voltage furthur includes means responsive to a discharged condition of a battery connected to said output terminal means and/or a high voltage upon said input terminal means for establishing said pedestal voltage at a level which prevents triggering of said gated rectifier means until the potential then on said input terminal means is decreasing from its peak value during that cycle to a value low enough so that the peak current through said gated rectifier means is always less than a predetermined value.

2. Electrical battery charging apparatus in accordance with claim 1 wherein said circuit means for controlling comprises circuit means responsive to the battery connected across said output terminal means being fully charged for reducing said pedestal voltage only after the potential across said output terminal means has first reached an overshoot potential higher than the floating potential of a fully charged battery connected to said output terminal means thereafter maintains across said output terminal means while said battery remains fully charged.

3. Electrical charging apparatus in accordance with claim 1 wherein said means responsive to a discharged condition of a battery and/or a high voltage upon said input terminal means comprises, a unilaterally conducting device connected to said capacitor, and voltage dividing means connected across said output terminal means and to said unilaterally conducting device for biasing the latter device into conduction only when the voltage across said output terminal means is less than a predetermined value for lowering the voltage to which said capacitor charges.

4. Electrical charging apparatus in accordance with claim 2 wherein said circuit means responsive to said battery being fully charged comprises, a current diverting transistor coupled to said capacitor for diverting charging current from said capacitor when rendered conductive, means for providing a battery potential signal representative of the potential of said battery, and a unilaterally conducting device coupling said battery potential signal to the control electrode of said current diverting transistor for rendering the latter conductive when said battery attains a predetermined potential corresponding to full charge.

5. Electrical charging apparatus in accordance with claim 4 and further comprising means for coupling a base of said unijunction transistor to said current diverting transistor control electrode to insure return of said unijunction transistor to the nonconducting state on each cycle of the singal waveform applied to said input terminal means.

6. Electrical battery charging apparatus comprising, input terminal means for receiving A.C. energy, output terminal means for receiving a potential from a battery to be charged, gated rectifier means intercoupling said input and output terminal means for converting said A.C. energy into D.C. energy for charging said battery, a pedestal and cosine modified ramp unijunction trigger circuit having a unijunction transistor with an emitter connected to an emitter capacitor and means for charging said capacitor to a predetermined pedestal level for controlling the time when said unijunction trigger circuit provides trigger pulses, and circuit means for controlling said pedestal voltage, said circuit means including means responsive to the charging current delivered by said output terminal means for limiting said charging current to less than a predetermined value, said circuit means for controlling comprises circuit means responsive to the battery connected across said output terminal means being fully charged for reducing said pedestal voltage only after the potential across said output terminal means has first reached an overshoot potential higher than the floating potential of a fully charged battery connected to said output terminal means thereafter maintains across said output terminal means while said battery remains fully charged, wherein said circuit means for controlling includes means responsive to a discharged condition of a battery connected to said output terminal means and/or a high voltage upon said input terminal means for establishing said pedestal voltage at a level which prevents triggering of said gated rectifier means until the potential then on said input terminal means is decreasing from its peak value during that cycle to a value low enough so that the peak current through said gated rectifier means is always less than a predetermined value.

7. Electrical charging apparatus in accordance with claim 6 wherein said means responsive to the charging current comprises a current sensing resistor of less than 1 ohm in series with said ouput terminal means, a current sensing transistor having at least base, emitter and collector electrodes, means including a low-pass filter for direct-coupling the base-emitter junction of said current sensing transistor across said current sensing resistor, and means for coupling the collector of said current sensing transistor to said means for charging said capacitor, said means responsive to a discharged condition of a battery and/or a high voltage upon said input terminal means comprises, a voltage divider connected across said output terminal means, a unilaterally conducting device connected to said capacitor, and voltage dividing means connected across said output terminal means and to said unilaterally conducting device for biasing the latter device into conduction only when the voltage across said output terminal means is less than a predetermined value for lowering the voltage to which said capacitor charges, and said circuit means responsive to said battery being fully charged comprises, a current diverting transistor coupled to said capacitor for diverting charging current from said capacitor when rendered conductive, means for providing a battery potential signal representative of the potential of said battery, and a unilaterally conducting device coupling said battery potential signal to the control electrode of said current diverting transistor for rendering the latter conductive when said battery attains a predetermined potential corresponding to full charge.

8. Electrical charging apparatus in accordance with claim 7 and further comprising means for coupling a base of said unijunction transistor to said current diverting transistor control electrode to insure return of said unijunction transistor to the nonconducting state on each cycle of the signal waveform applied to said input terminal means.

9. Electrical battery charging apparatus comprising, input terminal means for receiving A.C. energy, output terminal means for receiving a potential from a battery to be charged, gated rectifier means intercoupling said input and output terminal means for converting said A.C. energy into D.C. energy for charging said battery, a pedestal and cosine modified ramp unijunction trigger circuit having a unijunction transistor with an emitter connected to an emitter capacitor and means for charging said capacitor to a predetermined pedestal level for controlling the time when said unijunction trigger circuit provides trigger pulses, and circuit means for controlling said pedestal voltage, said circuit means including means responsive to the charging current delivered by said output terminal means for limiting said charging current to less than a predetermined value, wherein said means responsive to the charging current comprises a current sensing resistor of less than one ohm is series with said ouput terminal means,
a current sensing transistor having at least base, emitter and collector electrodes,
means including a low-pass filter for direct-coupling the base-emitter junction of said current sensing transistor across said current sensing resistor,
and means for coupling the collector of said current sensing transistor to means for charging said capacitor.

* * * * *